United States Patent
Højlund Nielsen

(10) Patent No.: US 11,117,809 B2
(45) Date of Patent: Sep. 14, 2021

(54) METHOD FOR START-UP HEATING OF AN AMMONIA SYNTHESIS CONVERTER

(71) Applicant: Haldor Topsøe A/S, Kgs. Lyngby (DK)

(72) Inventor: Poul Erik Højlund Nielsen, Fredensborg (DK)

(73) Assignee: Haldor Topsoe A/S, Lyngby (DK)

( * ) Notice: Subject to any disclaimer, the term of this patent is extended or adjusted under 35 U.S.C. 154(b) by 216 days.

(21) Appl. No.: 16/089,111

(22) PCT Filed: Apr. 24, 2017

(86) PCT No.: PCT/EP2017/059595
§ 371 (c)(1),
(2) Date: Sep. 27, 2018

(87) PCT Pub. No.: WO2017/186613
PCT Pub. Date: Nov. 2, 2017

(65) Prior Publication Data
US 2020/0299143 A1 Sep. 24, 2020

(30) Foreign Application Priority Data
Apr. 26, 2016 (DK) .............. PA 2016 00241

(51) Int. Cl.
C01C 1/04 (2006.01)
B01J 8/02 (2006.01)
B01J 23/745 (2006.01)
B01J 35/00 (2006.01)

(52) U.S. Cl.
CPC .......... *C01C 1/0447* (2013.01); *B01J 8/0285* (2013.01); *B01J 23/745* (2013.01); *B01J 35/0033* (2013.01); *C01C 1/0411* (2013.01); *B01J 2208/00433* (2013.01)

(58) Field of Classification Search
CPC .. C01C 1/0447; C01C 1/0411; B01J 35/0033; B01J 23/745; B01J 8/0285; B01J 2208/00433; B01J 2208/00469; Y02P 20/52
See application file for complete search history.

(56) References Cited

U.S. PATENT DOCUMENTS

| 2,519,481 | A |   | 8/1950 | Kubie et al. |
| 3,260,792 | A |   | 7/1966 | Kreisel |
| 4,536,380 | A | * | 8/1985 | Pirkle, Jr. ............ C07D 301/10 423/359 |
| 5,958,273 | A | * | 9/1999 | Koch ..................... B01J 8/0285 219/651 |
| 2003/0121908 | A1 | * | 7/2003 | Pilavdzic .............. B29C 48/865 219/630 |
| 2016/0023201 | A1 |   | 1/2016 | Chaudret et al. |

FOREIGN PATENT DOCUMENTS

| WO | WO 99/01211 A1 | 1/1999 |
| WO | WO 2015/140620 A1 | 9/2015 |
| WO | WO 2016/010974 A1 | 1/2016 |

OTHER PUBLICATIONS

K.H. Tshai et al., "Optimization of Green Synthesis of Ammonia by Magnetic Induction Method Using Response Surface Methodology," American Institute of Physics Conference Series, 2014, vol. 1621, pp. 223-230.

* cited by examiner

Primary Examiner — Anthony J Zimmer
Assistant Examiner — Syed T Iqbal
(74) Attorney, Agent, or Firm — Blank Rome LLP

(57) ABSTRACT

In a novel method for start-up heating of a converting re-actor in an ammonia synthesis plant, the conventional use of a gas fired heater is replaced by inductive heating. The inductive heating is obtained using an alternating high frequency current, which is passed through an inductive coil located inside the reactor, especially mounted inside a pressure shell. The method makes it possible to run reactions at high temperatures and high pressures in a very efficient way.

3 Claims, No Drawings

METHOD FOR START-UP HEATING OF AN AMMONIA SYNTHESIS CONVERTER

The present invention concerns start-up heating of an ammonia synthesis converter, where the catalyst bed is heated without using a gas stream as heat-carrying medium. More specifically, the invention relates to a method for startup heating of an ammonia synthesis converter, in which inductive heating is used instead of the traditional use of a gas fired heater.

Induction heating is the process of heating an electrically conducting object (usually a metal) by magnetic induction, through heat generated in the object by eddy currents (also called Foucault currents, which are loops of electrical current induced within conductors by a changing magnetic field in the conductor, due to Faraday's law of induction) and/or hysteresis loss. Eddy currents flow in closed loops within conductors, in planes perpendicular to the magnetic field.

An induction heater consists of an electromagnet and an electronic oscillator which passes a high-frequency alternating current (AC) through the electromagnet. The rapidly alternating magnetic field penetrates the object, whereby electric currents inside the conductor called eddy currents are generated. The eddy currents flowing through the resistance of the material will heat it by Joule heating. Eddy current heating is also denoted ohmic heating. In ferromagnetic (and ferrimagnetic and antiferromagnetic) materials like iron, heat may alternatively or additionally be generated by magnetic hysteresis losses. This is denoted ferromagnetic heating. The frequency of the current used depends on the object size, material type, coupling (between the induction coil and the object to be heated) and the penetration depth. An induction coil comprising a conductor bent into the form of a plurality of loops or windings is an example of an electromagnet.

Inductive heating is generally carried out using an alternating current, often of high frequency, which is passed through a coil. The subject to be heated is placed inside the coil. This procedure is, however, not very energy efficient, because the magnetic field generated by the coil will continue also outside the coil. While this drawback may be avoided by shaping the coil as a torus, there will still be a loss due to the resistance in the coil, i.e. the ohmic heat, which normally will be lost for the process.

It has now turned out that it is possible to establish a much more energy efficient approach. In said approach, the coil will be mounted within the reactor, and the catalyst will be placed inside the coil. This way, the ohmic heat will not be lost for the process, and provided that the pressure shell is based on iron with a low hysteresis, or alternatively that the pressure shell is coated on the inside with such iron type, the magnetic field generated by the coil will not be able to penetrate out of the reactor. At very high temperatures, the reactor may be walled up and possibly cooled to protect it by keeping the temperature below the Curie temperature, which is the temperature at which certain materials lose their permanent magnetic properties, to be replaced by induced magnetism. Typically, the coil can be made of Kanthal-type (Fe—Cr—Al alloy) wire, which resists reducing gases.

U.S. Pat. No. 2,519,481 describes temperature control of chemical reactions, more particularly the employment of induction heating, especially high frequency induction heating, for accurately controlling the temperature in a reaction zone. Thus, the patent describes induction heating of endothermic reactions and also the use of induction heating for start-up of exothermic reactions. The patent relates in particular to vapor or gas phase catalytic reactions, especially exothermic reactions.

In U.S. Pat. No. 4,536,380 a process for conducting reactions is described, in which a circulating, magnetically stabilized bed is used to control the reaction temperature profile. More specifically, this patent describes endothermic and exothermic catalytic reactions, e.g. ammonia synthesis reactions, in a fluidized bed. A magnetic field is applied to the reactor, mainly to prevent formation of bubbles in the fluidized bed. Moreover, iron or promoted iron particles are mentioned as catalysts for ammonia.

GB 673.305 describes an apparatus for electrically heating a stream of gas, of the kind in which an electrical conductor is disposed longitudinally in the stream in contact with the flowing gas. In particular, it describes an apparatus for ammonia synthesis comprising an electrical heating apparatus. The purpose of said heating apparatus is two-fold: providing energy for reducing fresh catalyst material and starting up the oven (i.e. the ammonia synthesis converter) after an interruption of its condition. The GB document is silent as regards magnetically induced heating.

WO 2015/140620 describes a method of synthetizing ammonia using the Haber-Bosch approach. A stoichiometric composition of 75 molar percent hydrogen and 25 molar percent nitrogen is introduced into a reaction chamber, which also comprises ferromagnetic iron powder. By applying an oscillating magnetic field, a temperature of 400° C. is maintained.

In WO 2016/010974, a method for producing ammonia is disclosed, wherein nitrogen and water are introduced into a reaction vessel comprising a superparamagnetic catalyst. A coil providing a fluctuating magnetic field is located in the vicinity of the reaction vessel.

Tshai, Kim Hoe, et al., Optimization of green synthesis of ammonia by magnetic induction method using response surface methodology (in American Institute of Physics Conference Series 2014, vol. 1621, pp 223-230), describes a method for producing ammonia by supplying $N_2$ and $H_2$ to a reactor comprising $\alpha$-$Fe_2O_3$ nanowires treated with 18 M $H_2SO_4$ at 750° C. A high frequency oscillating magnetic field is applied by a Helmholtz coil surrounding the reactor.

Finally, US 2006/0124445 relates to an electrical heating reactor for gas phase reforming. More specifically, the electrical heating is ohmic heating obtained by passing a current through a lining of the reactor. This US document neither describes preheating of the reactor for exothermic reaction, nor magnetically induced heating of the reactor.

In none of the prior art documents the position of the coil within the reactor is mentioned or suggested, and the shape of the coil, i.e. a torus, is also not disclosed in the prior art.

Thus, the present invention relates to a method for start-up heating of a converting reactor in an ammonia synthesis plant, wherein the conventional use of a gas fired heater is replaced by inductive heating obtained using an alternating high frequency current, which is passed through an inductive coil.

Preferably the inductive coil is located inside the reactor. It is further preferred that the inductive coil is mounted inside a pressure shell and that the ammonia catalyst is placed inside the coil.

The coil is preferably uninsulated, thereby having electrical contact with the catalyst.

The catalyst can be ferromagnetic, antiferromagnetic or non-magnetic. If it is non-magnetic, it is preferably mixed with a ferromagnetic material.

The catalytic synthesis of ammonia from hydrogen and nitrogen according to the equation

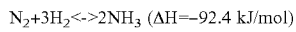

was developed around 1908 and improved to industrial scale a few years later. Since then, this method (the Haber-Bosch method) has been the predominant industrial scale method for ammonia production. The synthesis is carried out in a circulatory system commonly known as an ammonia synthesis loop. Only a fraction of the synthesis gas is converted per pass, as limited by the equilibrium concentration of $NH_3$ at the exit conditions of the converter. A reactor design for ammonia production comprises at least one ammonia converter containing an ammonia synthesis catalyst.

The ammonia converter is a reactor unit arranged to accommodate the catalyst material comprising one or more ferromagnetic macroscopic supports susceptible for induction heating, where the one or more ferromagnetic macroscopic supports are ferromagnetic at temperatures up to an upper limit of the given temperature range T. Said one or more ferromagnetic macroscopic supports are each coated with an oxide, where the oxide is impregnated with catalytically active particles. The ammonia converter further comprises an induction coil arranged to be powered by a power source supplying alternating current and being positioned so as to generate an alternating magnetic field within the converter upon energization by the power source, whereby the catalyst material is heated to a temperature within the given temperature range T by means of the alternating magnetic field.

The catalyst itself can be ferromagnetic, antiferromagnetic or non-magnetic. In the latter case, the catalyst can be mixed with a ferromagnetic material, for example iron beads or—for reactions at very high temperatures—metallic cobalt.

The one or more ferromagnetic macroscopic supports are ferromagnetic at temperatures up to at least an upper limit of the given temperature range T, viz. also at temperatures above the upper limit of the given temperature range T. The term "up to an upper limit of the given temperature range T" is meant to denote appropriate temperatures up to this upper limit, such as any temperature between the standard ambient temperature and the upper limit of the given temperature range T.

When the catalyst material within the ammonia converter comprises one or more ferromagnetic macroscopic supports comprising catalytically active particles, these active particles are heated from the heating of the ferromagnetic macroscopic supports. The catalytically active particles may thus be any appropriate paramagnetic or ferromagnetic element or combination of appropriate paramagnetic or ferromagnetic elements. An important feature of the induction heating process is that the heat is generated inside the object itself, instead of being heated by an external heat source via heat conduction. This means that objects can be very rapidly heated.

However, if the catalytically active particles are ferromagnetic themselves, they will be heated indirectly by the induction heating of the macroscopic supports as well as directly by the magnetic field. Hereby, a very fast heating rate directly in the catalytically active particles is achievable as well. Moreover, a catalyst material which, upon being subjected to an alternating magnetic field, is ferromagnetic at relevant operating conditions, such as at any relevant temperature up to the upper limit of the temperature range T, and possibly above, is advantageous as it will be explained below.

For ferromagnetic materials, induction heating takes place by both ferromagnetic/hysteresis heating and ohmic/eddy current heating. An estimation of the hysteresis heating is given by the formula: $P = \oint B dH^* f$, where P denotes the heating power transferred to the material, B the magnetic flux density, dH the change in the magnetic field strength, and f the frequency of the alternating magnetic field. Thus, the heating power transferred to the material by hysteresis heating is the area of the hysteresis curve multiplied by the frequency of the alternating magnetic field. An estimation of the ohmic/eddy current heating is given by the formula $P = \pi/20 \cdot B_m^2 \cdot l^2 \cdot \sigma \cdot f^2$, where P denotes the heating power transferred to the material, $B_m$ is the magnetic flux density induced in the material, l is a characteristic length of the material, $\sigma$ is the conductivity of the material and f is the frequency of the alternating magnetic field. Thus, the heating power transferred to the material by eddy current heating is proportional to the magnetic flux density squared as well as the frequency of the alternating magnetic field squared. Paramagnetic materials have a very small magnetic flux density B when subjected to an alternating magnetic field compared to ferromagnetic materials. Therefore, ferromagnetic materials are much more susceptible to induction heating than non-ferromagnetic materials, and either alternating magnetic fields of a lower frequency are usable for ferromagnetic materials compared to non-ferro-magnetic materials, or a lower frequency of the alternating magnetic field may be used. Generating a high-frequency magnetic field is relatively expensive energetically, so the use of a lower frequency of the magnetic field provides for cheaper heating of the material. Here, a high-frequency magnetic field is meant to be a field having a frequency in the MHz range, maybe from to 0.1 or 0.5 MHz and upwards.

A ferromagnetic material provides for further advantages, such as the following:

A ferromagnetic material absorbs a high proportion of the magnetic field, thereby making the need for shielding less important or even superfluous.

Heating of ferromagnetic materials is relatively faster and cheaper than heating of non-ferromagnetic materials. A ferromagnetic material has an inherent or intrinsic maximum temperature of heating, viz. the Curie temperature. Therefore, the use of a catalyst material which is ferromagnetic ensures that an endothermic chemical reaction is not heated beyond a specific temperature, viz. the Curie temperature. Thus, it is ensured that the chemical reaction will not run out of control.

The coil may be placed so that it has a direct electrical contact to the catalyst. In this case, an additional ohmic heating of the catalyst will take place. In addition, there will be no need for electrical isolation of the coil.

As used herein, the term "macroscopic support" is meant to denote a macroscopic support material in any appropriate form providing a high surface. Non-limiting examples are metallic or ceramic elements, monoliths or miniliths. The macroscopic support may have a number of channels; in this case it may be straight-channeled or be a cross-corrugated element. The material of the macroscopic support may be porous or the macroscopic support may be a solid. The word "macroscopic" in "macroscopic support" is meant to specify that the support is large enough to be visible with the naked eye, without magnifying devices.

The term "ferromagnetic heating" is meant to denote heating substantially generated by magnetic hysteresis losses within a material upon subjecting it to an alternating magnetic field. The term "ferromagnetic heating" is synonymous to the term "hysteresis heating". The terms "eddy current heating", "ohmic heating", "resistive heating" and "Joule heating" are synonymous. Eddy current heating is the process by which the passage of an electric current through a conductor releases heat.

The material of the ferromagnetic macroscopic support is for example a metallic or ceramic material. Ferromagnetic material includes iron, nickel, cobalt, and alloys thereof.

The method according to the invention, using an inductive coil mounted inside a pressure shell makes it possible to run reactions at high temperatures and high pressures in a very efficient way.

In the present invention, the start-up heater will be replaced by an inductive coil surrounding the catalyst bed. The amount of heat required for heating 100 t of ammonia catalyst by 400° C. is 10 MWh corresponding to an electric effect of 50 kW (5 kV and 10 A) in 200 hours.

The invention claimed is:

1. A method for start-up heating of a converting reactor in an ammonia synthesis plant, by inductive heating, comprising passing an alternating high frequency current through an inductive coil, wherein the inductive coil is located inside a pressure shell of the reactor, an ammonia catalyst is placed inside the coil, and the coil is uninsulated, whereby the coil is in electrical contact with the catalyst.

2. Method according to claim 1, wherein the catalyst is ferromagnetic, antiferromagnetic or non-magnetic.

3. Method according to claim 2, wherein the catalyst is non-magnetic, and the non-magnetic catalyst is mixed with a ferromagnetic material.

* * * * *